United States Patent [19] | [11] 4,029,308
Mathers | [45] June 14, 1977

[54] DEVICE PARTICULARLY SUITED FOR USE IN HANDLING HOODS OF MOTORIZED VEHICLES

[76] Inventor: E. H. Mathers, Rte. 1 No. Box 138, Ward, Ark. 72176

[22] Filed: June 7, 1976

[21] Appl. No.: 693,499

[52] U.S. Cl. .................................... 269/17; 269/71
[51] Int. Cl.[2] .......................................... B23Q 3/00
[58] Field of Search ......................... 269/17, 71–73, 269/58–59; 254/133, 134; 214/1 D

[56] References Cited

UNITED STATES PATENTS

| | | | |
|---|---|---|---|
| 1,474,212 | 11/1923 | Statham | 269/71 |
| 2,890,043 | 6/1959 | Bruns | 269/73 |
| 3,338,556 | 8/1967 | Sluse | 214/1 D |
| 3,643,935 | 2/1972 | Bell | 269/17 |
| 3,752,463 | 8/1973 | Schilke | 269/58 |
| 3,762,576 | 10/1973 | Castellano | 214/1 D |
| 3,858,864 | 1/1975 | Waldow | 269/59 |

*Primary Examiner*—Al Lawrence Smith
*Assistant Examiner*—Robert C. Watson
*Attorney, Agent, or Firm*—Huebner & Worrel

[57] ABSTRACT

An article handling device particularly suited for use in the removal and installation of hoods for motorized vehicles, such as automobiles and the like. The device is characterized by a bar mounted at the distal end of a pivotal, dolly-supported boom, in transverse relation therewith having extended in mutual parallelism from the opposite ends thereof suspension rods adapted to capture and support one end of the hood, and a retainer rod extended in substantial parallelism with the pair of suspension rods adapted to capture the opposite end of the hood.

3 Claims, 7 Drawing Figures

DEVICE PARTICULARLY SUITED FOR USE IN HANDLING HOODS OF MOTORIZED VEHICLES

BACKGROUND OF THE INSTANT INVENTION

The invention generally relates to an article handling device and more particularly to a device for use in the removal and installation of hoods for motorized vehicles.

As can be appreciated by those familiar with automobile repair services, and the like, often it is highly desirable, or even necessary to remove the hood of an automobile before adequate access to a motor is afforded. Of course, for reasons which should readily be apparent, the task of removing a hood is performed by a mechanic, preferably unassisted by others. Of course, a mechanic working alone often encounters great difficulty since the hood tends to become disoriented resulting in a binding of support pins. Thus the task of removing a hood often cannot be successfully performed by an unassisted mechanic.

It is, therefore, the general purpose of the instant invention to provide an article handling device which is particularly suited for use in handling the hood of an automobile, or similar motorized vehicle, for facilitating removal and installation of automobile hoods by a mechanic unassisted.

OBJECTS AND SUMMARY OF THE INVENTION

It is an object of the instant invention to provide an article handling device which overcomes the aforementioned difficulties and disadvantages.

It is another object to provide an article handling device having particular utility in handling hoods of motorized vehicles, whereby installation and removal of automobile hoods are facilitated.

It is another object to provide an article handling device adapted to be manipulated by a mechanic during an installation or removal of a hood or the like from an automobile.

Another object is to provide an article handling device adapted to be attached at a multiplicity of mutually spaced points to the hood of an automobile for lifting and transporting the hood.

It is another object to provide an article handling device adapted to be removably affixed to the distal end of a pivotal, dolly-supported boom and attached to the hood of an automobile for facilitating installation and/or removal by a mechanic working alone.

Another object is to provide an article handling device which is particularly useful in connection with the installation and removal of hoods of motorized vehicles, such as automobiles and the like, although not necessarily restricted in use thereto, since the device can be employed in the handling of hoods for motorized vehicles without regard to the purpose for which the hoods are handled.

These and other objects and advantages are achieved through the use of a device characterized by a bar transversely mounted at the extended end of a dolly-supported, pivotal boom adapted to be extended transversely beneath the hood of an automobile and having extended in a first direction from each of its opposite ends a suspension rod adapted to capture one end of the hood, and a retainer rod, extended in an opposite direction adapted to capture the opposite end of the hood, whereby the hood is supported in a manner such that removal and installation of the hood by a mechanic unassisted are facilitated, as will hereinafter become more readily apparent by reference to the description and claims in light of the accompanying drawings.

DESCRIPTION OF THE PREFERRED EMBODIMENT

Figure 1:
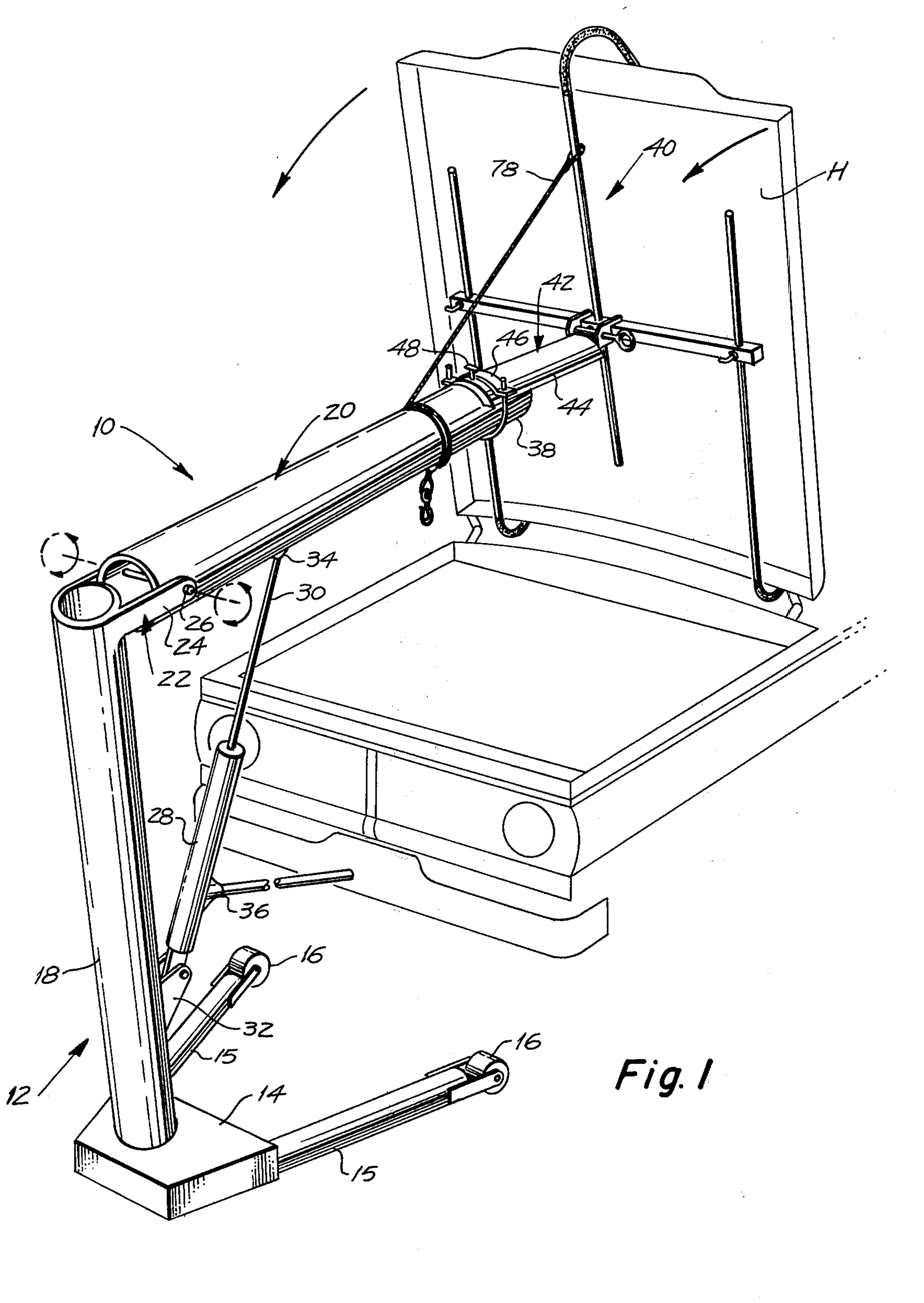
FIG. 1 comprises a perspective view of a device, in an operative environment, which embodies the principles of the instant invention.
Figure 2:
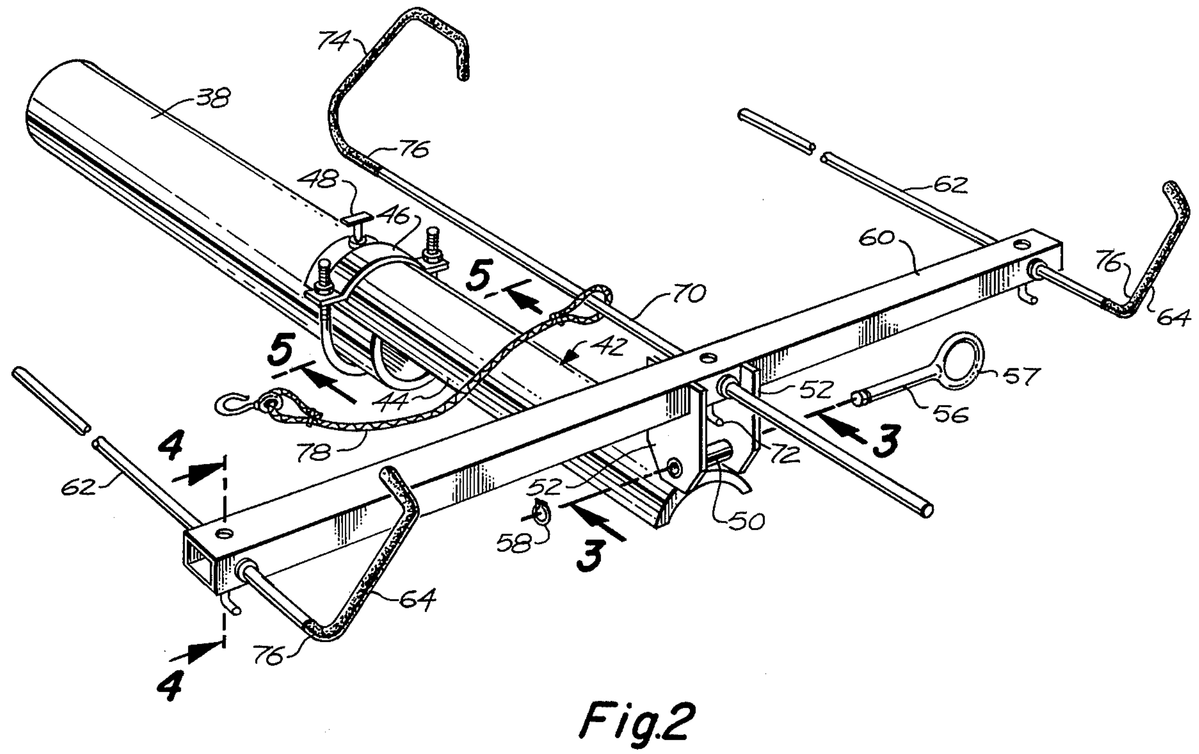
FIG. 2 is a perspective, fragmented partially exploded view of the device shown in FIG. 1.
Figure 3:
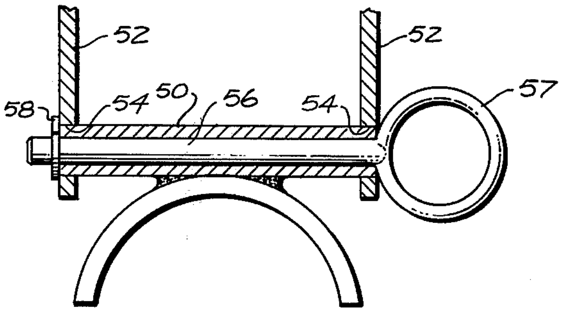
FIG. 3 is a cross-sectional view taken generally along line 3—3 of FIG. 2.
Figure 5:
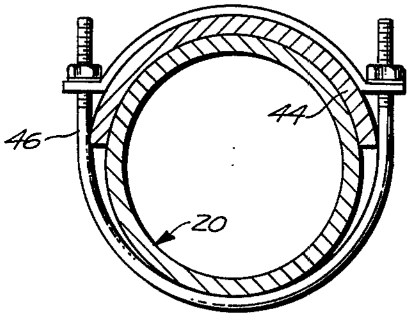
FIG. 5 is a cross-sectional view taken generally along line 5—5 of FIG. 2.

Referring now to the drawings wherein like reference characters designate like or corresponding parts of the several views, there is shown in FIG. 1 an article handling device, generally designated 10, embodying the principles of the instant invention.

As shown in FIG. 1 the device 10 includes a supporting dolly 12 having a pedestal 14 from which is extended a pair of angularly related legs 15. At the distal ends of these legs there is provided a pair of wheels 16, which facilitate horizontal displacement of the dolly.

Extended vertically from the pedestal 14 is a base 18 from the upper end of which there is extended a boom 20. The base 18, as shown, is of a tubular configuration while the boom 20 is pivotally connected thereto by a pivotal coupling 22. This coupling is characterized by a pair of horizontally extended arms 24, welded or otherwise rigidly affixed to the base 18, and a wrist pin 26 extended through suitable apertures formed in the arms 24 and arranged in coaxial alignment with a bore, not designated, extended diametrically through the adjacent end portion of the boom 20. It will, therefore, be appreciated that the boom is supported by the pivotal coupling 22 for oscillation in a vertical plane.

Oscillation is imparted to the boom through the use of a slave cylinder 28 having a linear output shaft 30 connected with the boom 20 in spaced relation with the wrist pin 26. The base end of the slave cylinder 28 is pivotally connected with the base 18 through a suitable clevis coupling 32, while a similar clevis 34 is provided for pivotally connecting the distal end of the shaft 30 to the boom 20.

As a practical matter, a suitable circuit, not designated, including a hand-pump 36 is provided for actuating the slave cylinder 28. Since hydraulic circuits including hand-pumps and slave cylinders are well known and operate in a manner well understood by those familiar with the use of portable slave cylinders, a detailed description of the circuit, hand-pump 36 and the slave cylinder 28 is omitted in the interest of brevity.

It is to be understood, however, that since the boom 20 is supported by the dolly 12 it is supported for displacement in horizontal directions, and since it is coupled with the dolly through the pivotal coupling 22, pivotal displacement about an axis coincident with the axis of the wrist pin 26 is accommodated. Thus the distal end portion, designated 38, of the boom 20 is supported for simultaneous vertical and horizontal displacement. Moreover, vertical displacement of the distal end portion of the boom can readily be achieved through an operation of the hand-pump by a single operator, such as a mechanic, acting unassisted.

Mounted at the distal end portion 38 of the boom 20, there is a hood support generally designated 40. The hood support 40 includes a mounting head 42. As shown, the head 42 includes a base plate 44, of a semi-cylindrical configuration affixed to the distal end portion 38 of the boom 20. The base plate 44, as a practical matter, is attached to the distal end of the boom employing any suitable couplings, such as a U-bolt and pillow block coupling 46. A bolt 48 is extended through the base plate 44 and screw threaded into the boom for further securing the base plate 44 to the distal end portion 38 of the boom 20.

To the head 42 there is welded a tubular body forming a hinge barrel 50. As a practical matter, the axis of the barrel 50 is extended transversely with respect to the longitudinal axis of the boom. The opposite ends of the barrel 50 are received within a pair of plates 52. While the plates and the barrel are coupled in any manner which accommodates pivotal motion therebetween, it has been found that coaxially aligned apertures 54 formed in the plates for receiving the ends of the barrel 50 function satisfactorily for this purpose. Thus, in practice, the end portions of the barrel 50 function as a bearing upon which the plates 52 pivotally rotate. A retainer pin 56, having an eye 57 formed at one end thereof, is extended through the barrel 50 and secured in place by a locking ring 58 seated in an appropriately formed groove, not designated, located near the end of the retainer pin opposite the eye, so that displacement of the plates 52 in axial directions, relative to the barrel 50, is precluded.

The plates 52 extend in substantial parallelism from the barrel 50 and receive a transversely oriented bar 60. It will, of course, be appreciated that the bar 60 and plates 52 are interconnected in any suitable manner. However, as shown, the bar 60 comprises a segment of box tubing which is received in suitably formed, aligned, apertures, not designated, within which the bar 60 readily nests. Where desired, the bar 60 is united with the plates as by welding or the like.

Figure 4:
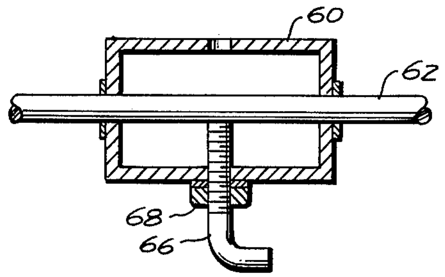
FIG. 4 is a cross-sectional view taken generally along line 4—4 of FIG. 2.
Figure 6:
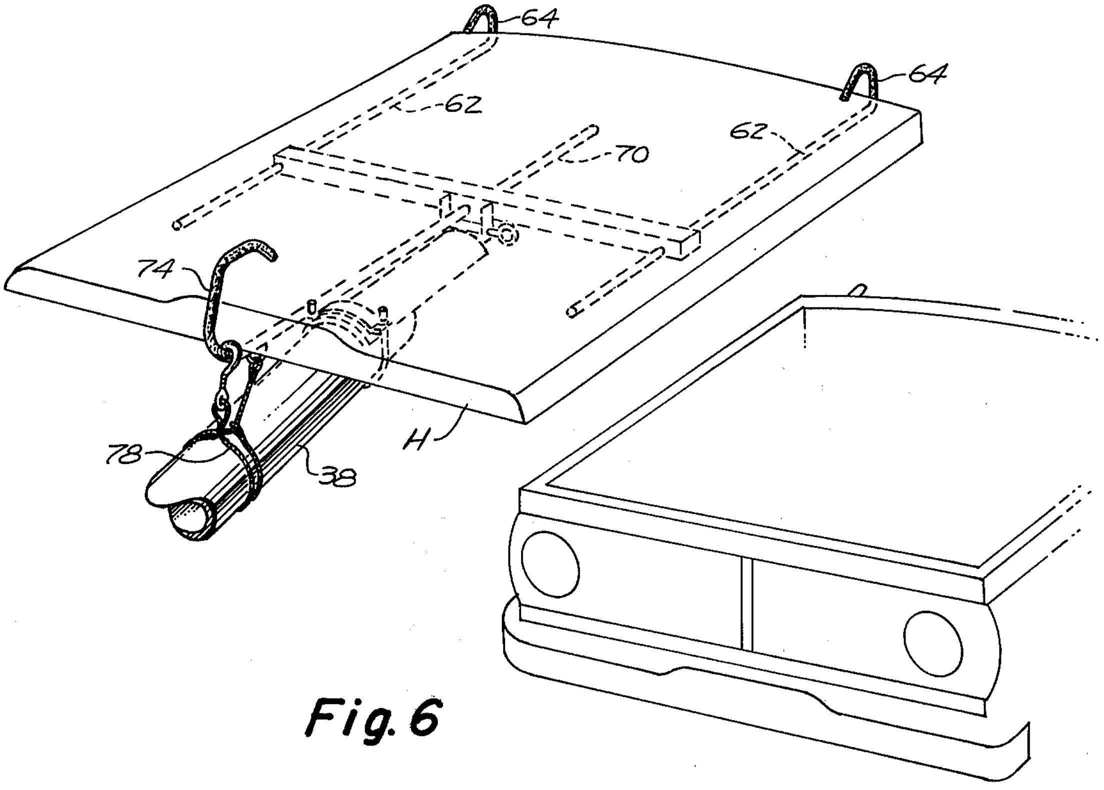
FIG. 6 is a perspective, fragmented view of a slightly modified embodiment of the invention illustrating a cable attached at a fixed location.

Disposed at each of the opposite ends of the bar 60 and extended therefrom, is a suspension rod 62. Each of the suspension rods 62 includes a linear body and an angulated end portion, designated 64, suitably configured to receive in supported relation one end portion of the hood H, as shown in FIGS. 1 and 6. In practice, each of the suspension rods 62 is extended through a pair of suitably formed apertures, not designated, and is releasably affixed to the bar 60 by means of a setscrew 66, FIG. 4, threaded through a nut 68 welded or otherwise rigidly affixed to the bar 60. The nut is arranged, of course, in coaxial alignment with an aperture, not designated. Thus the position of each of the suspension rods 62 may be varied as desired, relative to the bar 60, simply by loosening the setscrew 66 and axially displacing the rod within the apertures through which it extends.

Extended in parallelism with the suspension rod 62, there is a retainer rod 70. The primary function of this rod is that of a stabilizer for a hood H as the hood is supported by the suspension rods 62, although the retainer rod does, in practice, further support the hood. The retainer rod 70 extends through aligned apertures formed in the centermost portion of the bar 60 and is secured in place through the use of a setscrew 72, similar in design, configuration and function to the setscrew 66. Thus it is possible to reposition the retainer rod 70 simply by loosening the setscrew 72 and repositioning the retainer rod 70 axially with respect to the bar 60.

Like the suspension rods 62, the retainer rod 70 includes an angulated end portion 74 suitably configured to receive the end of the hood H, as best illustrated in FIGS. 1 and 6. It will be appreciated that the end portions of both the suspension rods 62 and the retainer rod 70 are coated with an anti-abrasive material 76, such as rubber, polyethylene or the like in order to protect the layer of paint provided on the surface of the hood H. In order to secure the hood support 40 in a fixed relationship with the distal end portion 38 of the boom 20, there is provided a flexible steel cable 78 having a suitable hook provided at one end thereof while the opposite end thereof is attached to the retainer rod 70. Preferably, the cable 78 is of a suitable length such that it may be readily wrapped about the distal end portion 38 of the boom and attached to the retainer rod employing the hook for supporting the hood H against pivotal displacement toward a vertical plane, as best illustrated in FIG. 6. Thus the orientation of the hood H is fixed as the hood is transported employing the device 10. As shown in FIG. 1, the cable 78 includes an eye, not designated, which permits the cable to be moved along the retainer rod 70, while the cable 78, as depicted in the modification shown in FIG. 6, is connected to the retainer rod through an eye welded thereto.

Figure 7:
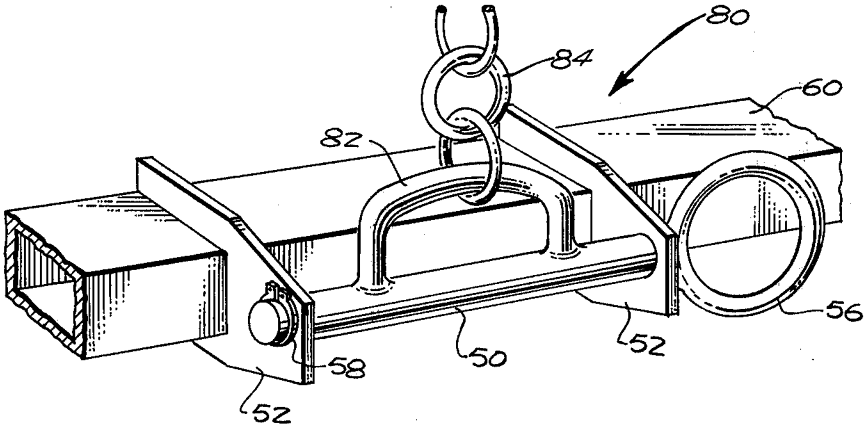
FIG. 7 is a fragmented, perspective view illustrating still another embodiment of the invention.

If found desirable, a chain hoist is utilized for purposes of repositioning the hood H in lieu of the boom 20. As shown in FIG. 7, the head 42 is deleted while a head 80, including the plates 52, is provided for receiving the bar 60. However, rigidly affixed to the barrel 50 as by welding or the like, there is an arcuate bar 82 forming an eye for receiving one end of a chain 84 affixed thereto in a suitable manner. It is to be understood that the chain 82 extends downwardly from a horizontally movable chain hoist having a capability of imparting vertical motion to the support 40 of which the bar 60 forms an integral part.

OPERATION

It is believed that in view of the foregoing description, the operation of the device will readily be understood and it will be briefly reviewed at this point.

With the article handling device 10 assembled in the manner hereinbefore described, the handling of an automobile hood, or the like, during installation and removal, by a mechanic unassisted, is facilitated. To employ the device, the bar 60 is extended transversely beneath the hood H while the distal end portions 64 of the rods 62 are projected beneath the lower end of the hood H into a capturing relationship therewith.

The retainer rod 70 is adjustably repositioned until the distal end portion 74 thereof is seated in a capturing relationship with the hood H, as illustrated in FIGS. 1 and 6. The setscrew 72 is then tightened for securing the retainer rod 70 is a fixed relationship with the hood support 40. A mechanic, unassisted, now repositions the hood simply by repositioning the boom 20 in either vertical or horizontal directions, as is desired. Of course, once the hood H is captured by the distal end portions 64 and 74 of the suspension rod 62 and retainer rod 70, respectively, the cable 78 is passed about the distal end portion 38 of the boom 20 and secured for thus securing the hood in a fixed orientation relative to the boom. The hood H thus is supported to be repositioned by the mechanic or other operator of the device 10.

In instances where the head 80 is employed, in lieu of the head 42, vertical motion is imparted to the hood support 40 by activating the chain hoist from which the chain 84 is suspended. Translation of the hood H is effected by translating the chain hoist.

In view of the foregoing, it should readily be apparent that the article handling device which embodies the principles of the instant invention provides a practical solution to the perplexing problem of achieving and maintaining a desired orientation for hoods of motorized vehicles such as automobiles and the like, particularly in instances where installation and removal of hoods must be achieved by a mechanic acting unassisted.

Although the invention has been herein shown and described is what is conceived to be the most practical and preferred embodiment, it is recognized that departures may be made therefrom within the scope of the invention, which is not to be limited to the illustrative details disclosed.

I claim:

1. An article handling device particularly suited for use in the removal and installation of hoods for motorized vehicles, such as automobiles and the like, comprising:

A. hood support means adapted to be attached to a hood of a selected vehicle at a plurality of mutually spaced points including a bar adapted to be extended transversely of the hood, a pair of suspension rods arranged in substantial parallelism and extended in a common direction from the opposite ends of said bar, each of said rods being characterized by an angulated end portion adapted to engage the hood at one end thereof and support the hood in a captured relationship, and stabilizing means for stabilizing the hood as it is supported by the suspension rods including a retainer rod extended in substantial parallelism with said pair of suspension rods having an end portion of an angulated configuration adapted to engage and capture the hood at the end thereof opposite said one end; and B. transport means connected in supporting relation with the hood support means for repositioning the hood relative to a given vehicle including a head having a base plate, means pivotally coupling the base plate to said bar, a pivotal boom mounted on a horizontally movable dolly, and means for removably connecting the base plate to the boom near one end thereof.

2. An article handling device particularly suited for use in a removal and an installation of hoods for motorized vehicles, such as automobiles and the like, comprising:

A. hood support means adapted to be attached to a hood of a selected vehicle at a plurality of mutually spaced points including a bar adapted to be extended transversely beneath the hood, a pair of hood suspension rods arranged in substantial parallelism and extended in a common direction from opposite ends of said bar, each of said rods being characterized by an angulated end portion adapted to engaged the hood at one end thereof and support the hood in a captured relationship;

B. means for adjustably connecting the suspension rods of said pair to said bar, and stabilizing means for stabilizing the hood as it is supported by the suspension rods including a retainer rod disposed in an oppositely extended, substantial parallel relation with said pair of suspension rods and having an end portion of an angulated configuration adapted to engage and capture the hood at the end thereof opposite said one end; and C. transport means connected to said bar in supporting relation therewith for repositioning the bar relative to a given vehicle.

3. The device of claim 2 wherein said transport means includes a dolly-supported pivotal boom.

* * * * *